(12) United States Patent
Häkkinen et al.

(10) Patent No.: US 7,069,038 B2
(45) Date of Patent: Jun. 27, 2006

(54) SYSTEM AND METHOD FOR IMPROVED UPLINK SIGNAL DETECTION AND REDUCED UPLINK SIGNAL POWER

(75) Inventors: Hannu Häkkinen, Espoo (FI); Antti Toskala, Espoo (FI)

(73) Assignee: Nokia Corporation, Espoo (FI)

( * ) Notice: Subject to any disclaimer, the term of this patent is extended or adjusted under 35 U.S.C. 154(b) by 136 days.

(21) Appl. No.: 10/776,170

(22) Filed: Feb. 12, 2004

(65) Prior Publication Data

US 2004/0224697 A1    Nov. 11, 2004

Related U.S. Application Data

(60) Provisional application No. 60/456,256, filed on Feb. 13, 2003.

(51) Int. Cl.
*H04B 7/00* (2006.01)
*H04Q 7/20* (2006.01)

(52) U.S. Cl. .................. 455/522; 455/69; 370/337; 370/332

(58) Field of Classification Search .................. 455/69, 455/522, 422.1, 423, 424, 425, 68, 67.11, 455/67.1; 370/337, 442, 330, 332, 333, 335, 370/441
See application file for complete search history.

(56) References Cited

U.S. PATENT DOCUMENTS

| | | | |
|---|---|---|---|
| 2001/0023189 A1 | 9/2001 | Kajimura | |
| 2002/0046379 A1* | 4/2002 | Miki et al. | 714/749 |
| 2002/0172217 A1* | 11/2002 | Kadaba et al. | 370/443 |
| 2003/0045288 A1* | 3/2003 | Luschi et al. | 455/434 |
| 2003/0189918 A1* | 10/2003 | Das et al. | 370/349 |
| 2003/0228876 A1* | 12/2003 | Hwang | 455/522 |
| 2004/0009767 A1* | 1/2004 | Lee et al. | 455/422.1 |
| 2004/0116143 A1* | 6/2004 | Love et al. | 455/522 |
| 2004/0202147 A1* | 10/2004 | Hakkinen et al. | 370/351 |
| 2004/0203980 A1* | 10/2004 | Das et al. | 455/522 |
| 2004/0223507 A1* | 11/2004 | Kuchibhotla et al. | 370/428 |
| 2004/0240400 A1* | 12/2004 | Khan | 370/280 |
| 2005/0180384 A1* | 8/2005 | Jeong et al. | 370/350 |
| 2005/0213575 A1* | 9/2005 | Shin et al. | 370/389 |

FOREIGN PATENT DOCUMENTS

WO    WO 03/084274 A1    10/2003

* cited by examiner

*Primary Examiner*—Edan Orgad
(74) *Attorney, Agent, or Firm*—Squire, Sanders & Dempsey LLP

(57) ABSTRACT

System and methods for improved uplink signal detection where when a mobile device detects signaling indicating the presence of a packet for that mobile device from a network node, the mobile device may transmit one or more NACKs in a sub-frame before the one in which the mobile device would transmit the normal ACK/NACK for the packet. Additionally, the mobile device may transmit one or more NACKs in the sub-frame immediately following the normal ACK/NACK for a packet (unless a packet was transmitted in the immediately following sub-frame and successfully decoded by the mobile device, in which case an ACK would obviously be transmitted). Therefore, extra uplink (UL) interference is eliminated. Moreover, the amount that a network node must offset its ACK/NACK decision threshold is significantly reduced. This results in a reduction of required ACK power by a mobile device.

67 Claims, 11 Drawing Sheets

SYSTEM AND METHOD FOR IMPROVED UPLINK SIGNAL DETECTION AND REDUCED UPLINK SIGNAL POWER

The present application claims priority to U.S. Provisional Patent Application Ser. No. 60/456,256 filed Feb. 13, 2003, the entire contents therein being incorporated by reference herein in its entirety.

BACKGROUND

1. Field of the Invention

This invention relates to packet transmission in a network, and more specifically to NACK repetition in uplink (UL) packet transmission in a Universal Mobile Telecommunication System (UMTS) for improved uplink signal detection and reduced uplink signal power.

2. Background Information

Currently, the User Equipment (UE), e.g., mobile device, will use discontinuous transmission (DTX) in the acknowledge/negative acknowledge (ACK/NACK) field on the high-speed dedicated physical control channel (HS-DPCCH) if the UE fails to detect correctly the signaling on the high-speed shared control channel (HS-SCCH). The Node B (network device) must offset its ACK/NACK decision threshold so as to avoid erroneously detecting this DTX as an ACK, or else the packet will be lost. The effect of this is to increase significantly the transmit power required by the UE for the ACKs.

Documents R1-02-0917, "Reduction of HS-DPCCH power requirements", Philips, R1-01-1199, "Improvement in power requirements for ACK/NACK signaling", Philips, and R1-02-0042, "Further results on methods for reducing the power required for ACK/NACK signaling", Philips, are all incorporated by reference herein, and proposed that the UE should continue to transmit NACKs in every HS-DPCCH sub-frame after reception of an high-speed downlink shared channel (HS-DSCH) packet for the duration of a timer. While the timer was running, the Node B would not have to offset its detection threshold, so the ACK power for any subsequent packets during this period could be much lower. However, this method is disadvantageous in that extra UL interference is generated if no HS-DSCH packets are transmitted while the timer is running. Node B detection performance will not be good if there is need to separately detect ACK, NACK, and also DTX state.

SUMMARY OF THE INVENTION

System and methods for improved uplink signal detection where when a mobile device detects signaling indicating the presence of a packet for that mobile device from a network node, the mobile device may transmit one or more NACKs in a sub-frame before the one in which the mobile device would transmit the normal ACK/NACK for the packet. Additionally, the mobile device may transmit one or more NACKs in the sub-frame immediately following the normal ACK/NACK for a packet (unless a packet was transmitted in the immediately following sub-frame and successfully decoded by the mobile device, in which case an ACK would obviously be transmitted). Therefore, extra uplink (UL) interference is eliminated. Moreover, the amount that a network node must offset its ACK/NACK decision threshold is significantly reduced. This results in a reduction of required ACK power by a mobile device.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
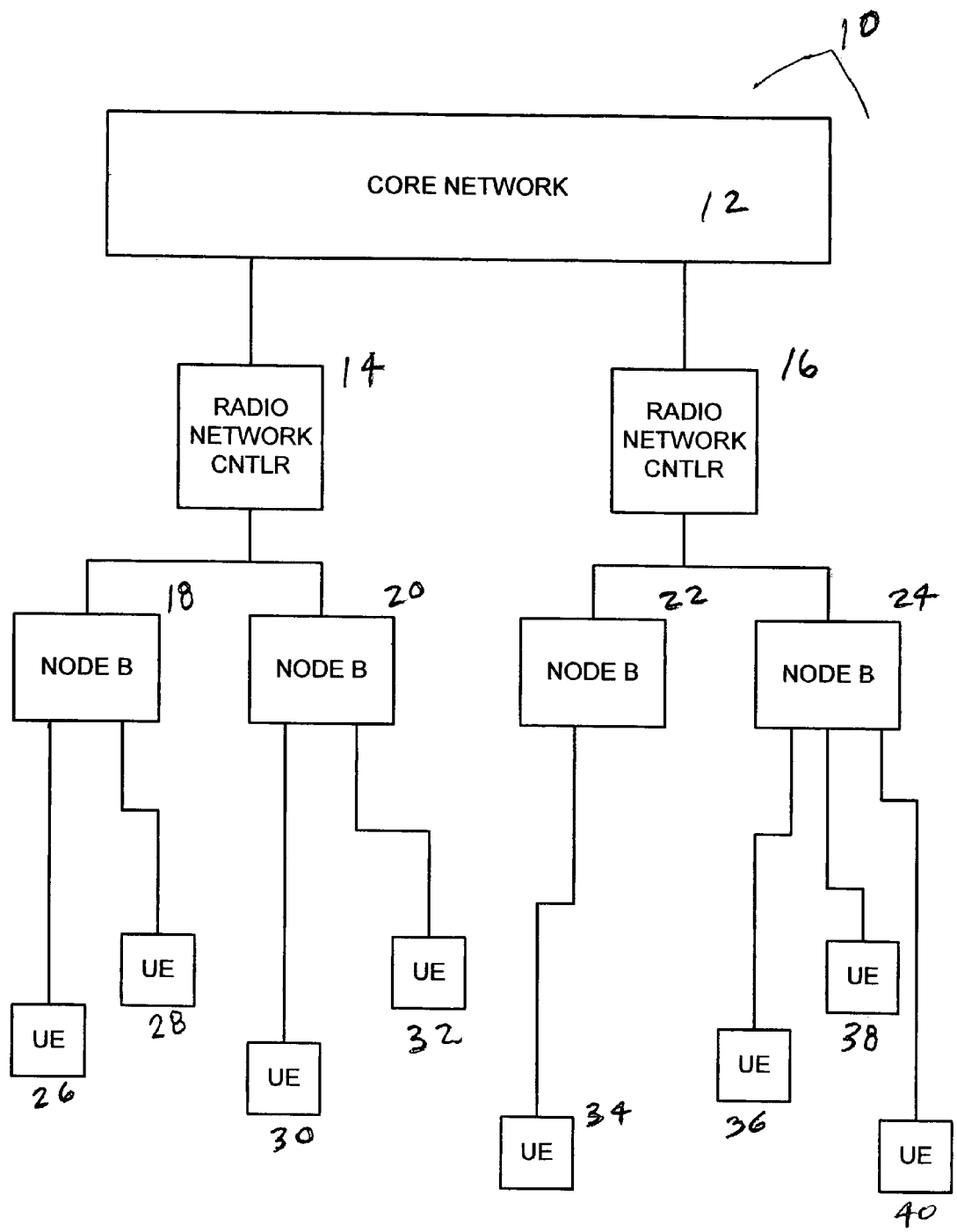
FIG. 1 is a system diagram of a radio access network (RAN) for improved uplink signal detection according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention.

The appearances of the phrase "in one embodiment" in various places in the specification are not necessarily all referring to the same embodiment.

The present invention is being illustrated using embodiments related to a Universal Mobile Telecommunication System (UMTS) and associated network elements and terminology, but is not limited to this type system or network and may be applied to any system or network that is within the spirit and scope of the present invention. Embodiments of the present invention relate to how to determine and when to generate extra NACK transmissions from a mobile device (e.g., UE) to a network node (e.g., Node B) to avoid DTX detection at the Node B receiver, thus improving the detection performance at the Node B. The embodiments according to the present invention enhance current methods with the control of the added NACK messages. The control allows the terminal (mobile device) to determine how many extra NACK messages to send. The criteria for how many NACK messages to send may take the terminal capability into account as well (inter Transmission Time Interval (TTI) arrival parameter).

Therefore, in embodiments of the present invention, any timer may be limited to 1 sub-frame, thus virtually eliminating the extra UL interference generated. In other words, the UE should transmit a NACK just in the sub-frame immediately following an ACK/NACK for a downlink channel (e.g., HS-DSCH) packet (unless a downlink packet was transmitted in the next sub-frame and successfully decoded by the UE, in which case an ACK would obviously be transmitted). In addition, when the UE detects signaling on a control channel (e.g., HS-SCCH) indicating the presence of a downlink (HS-DSCH) packet for that UE, the UE may transmit an additional NACK in the uplink channel (e.g., HS-DPCCH) sub-frame before the one in which the UE would transmit the normal hybrid ARQ ACK/NACK for the packet.

According to embodiments of the present invention, if the UE fails to detect the HS-SCCH signaling, it may DTX two consecutive sub-frames on the HS-DPCCH. Thus, the probability of the Node B mis-detecting the DTX can be divided between the two sub-frames. For example, if P(DTX->ACK) is required to be 0.01 (as has been generally assumed in current methods), then this can now be achieved by setting the Node B's decision thresholds such that P(DTX->NACK)=0.1 in the sub-frame before the normal ACK/NACK transmission, and P(DTX->ACK)=0.1 for the normal ACK/NACK transmission. Therefore, according to embodiments of the present invention, the Node B's decision threshold is offset much less than for P(DTX->ACK)=0.01, with the result that the ACK transmit power can be significantly reduced.

FIG. 1 shows a system diagram of a radio access network (RAN) for improved uplink signal detection according to an example embodiment of the present invention. Radio access network 10 may include a core network 12, one or more Radio Network Controllers (RNC) 14, 16, one or more network nodes (e.g., node B) 18–24, and one or more user equipment (UE) 26–40. User Equipments 26–40 may be mobile devices that have a wireless interface to the Node B devices 18–24. Node B 18–24 provides the User Equipment 26–40 access to core network 12 through RNCs 14, 16.

According to embodiments of the present invention, when a UE 26–40 detects signaling indicating the presence of a packet for that UE from a Node B 18–24, the UE may transmit one or more additional NACKs in a sub-frame before the one in which the UE would transmit the normal ACK/NACK for the packet. Additionally, the UE may transmit one or more NACKs in the sub-frame immediately following the normal ACK/NACK for a packet (unless a packet was transmitted in the immediately following sub-frame and successfully decoded by the UE, in which case an ACK would obviously be transmitted). Therefore, extra uplink (UL) interference that may be generated by use of prior art timers is eliminated by use of the present invention. Moreover, the amount that a Node B, 18–24, must offset its ACK/NACK decision threshold is significantly reduced. This results in a reduction of required ACK power by a UE 26–40.

Figure 2:
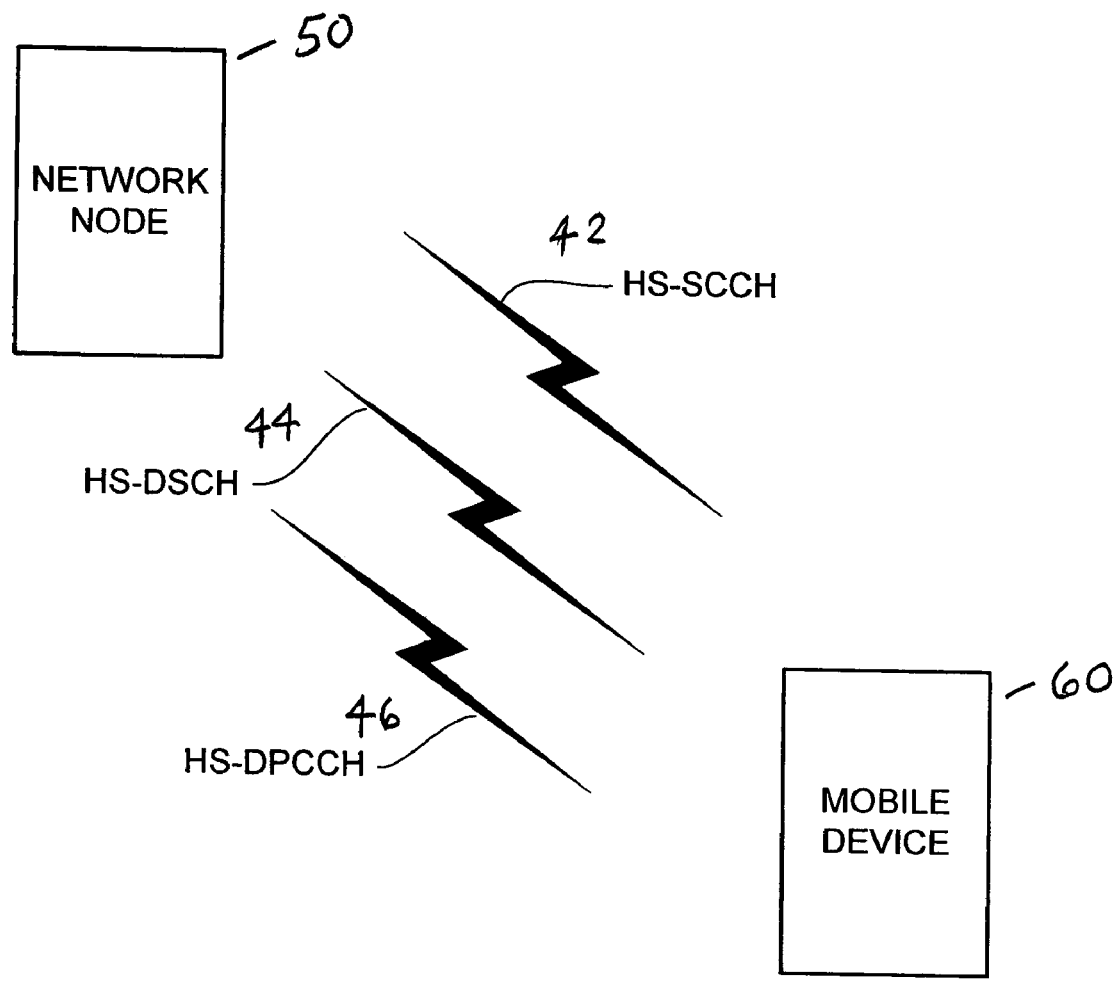
FIG. 2 is a system diagram of the interface between a network node and mobile device according to an example embodiment of the present invention.

FIG. 2 shows a system diagram of the interface between a network node and mobile device according to an example embodiment of the present invention. A network node 50 may interface with a mobile device 60 via a wireless interface that may include one or more different channels, each of which may carry different types of information. One channel may be an control channel, e.g., a high-speed shared control channel (HS-SCCH) 42 that carries control information from a network node 50 to a mobile device 60. Further, a downlink channel, e.g., a high-speed downlink shared channel (HS-DSCH) 44 may carry data associated with the control information in the HS-SCCH 42 from network node 50 to mobile device 60. Moreover, an uplink channel, e.g., a high-speed dedicated physical control channel (HS-DPCCH) 46 may be used to carry acknowledgement information such as an acknowledgement signal (ACK) or negative acknowledgement signal (NACK) from mobile device 60 to network node 50 indicating appropriate reception or an error on reception of the control information from HS-SCCH 42 or the data on the HS-DSCH 44. Network node 50 may be any of many types of network nodes such as, for example, a Node B, server, base station, etc. Further, mobile device 60 may be any type of wireless device such as, for example, a mobile phone, personal digital assistant (PDA), portable computer, etc.

Figure 3:
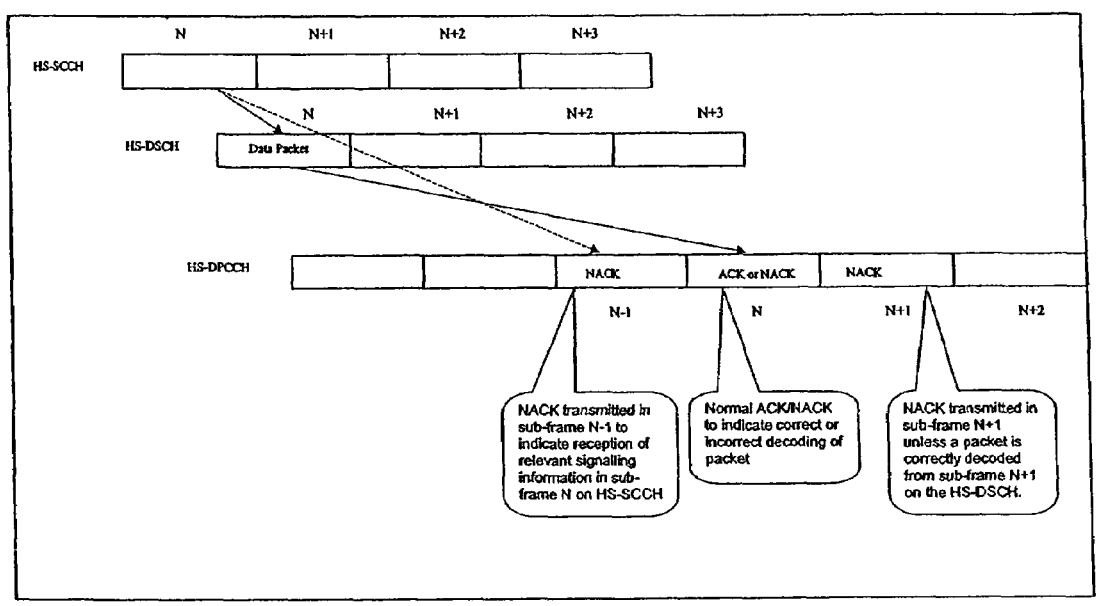
FIG. 3 is a diagram of channels for improved uplink signal detection according to an example embodiment of the present invention.

FIG. 3 shows a diagram of channels for improved uplink signal detection according to an example embodiment of the present invention. When a UE detects relevant control information in the sub-frame labeled "N" on the HS-SCCH for that UE, the UE may transmit a NACK in sub-frame N−1 on the HS-DPCCH (unless a packet was successfully decoded from sub-frame N−1 on the HS-DSCH). In sub-frame N on the HS-DPCCH, the UE transmits the normal ACK or NACK indicating the result of decoding the packet received in sub-frame N on the HS-DSCH. In sub-frame N+1 on the HS-DPCCH the UE may transmit a NACK (unless a packet is successfully decoded from sub-frame N+1 on the HS-DSCH, in which case ACK is sent). In sub-frames N+2 onwards on the HS-DPCCH, the UE goes back to using DTX in the ACK/NACK field unless new relevant control information is detected on the HS-SCCH for this UE.

Moreover, according to embodiments of the present invention, the UE or mobile device may generate and send one or more additional NACK transmissions based on specific situations that may currently exist. For example, if the UE is in a soft handover (SHO) (more than one RL), then more NACKs may be sent. In addition, if a maximum power is reached, then more NACKs may be sent. Further, if site selection diversity transmission (SSDT) signalling indicated a HSDPA serving cell is non-primary, then more NACKs may be sent. Also, if channel quality indication (CQI) for the worst possible data rate/offset is detected, then more NACKs may be sent. If there is over a certain period (e.g., 6 slots) a mismatch between the power control decisions in SHO and the power control commands from a HSDPA serving cell, then more NACKs may be sent. The present invention is not limited to these situations as there may be other situations that exist or come up where it may be desired to transmit additional NACKs.

Figure 4:
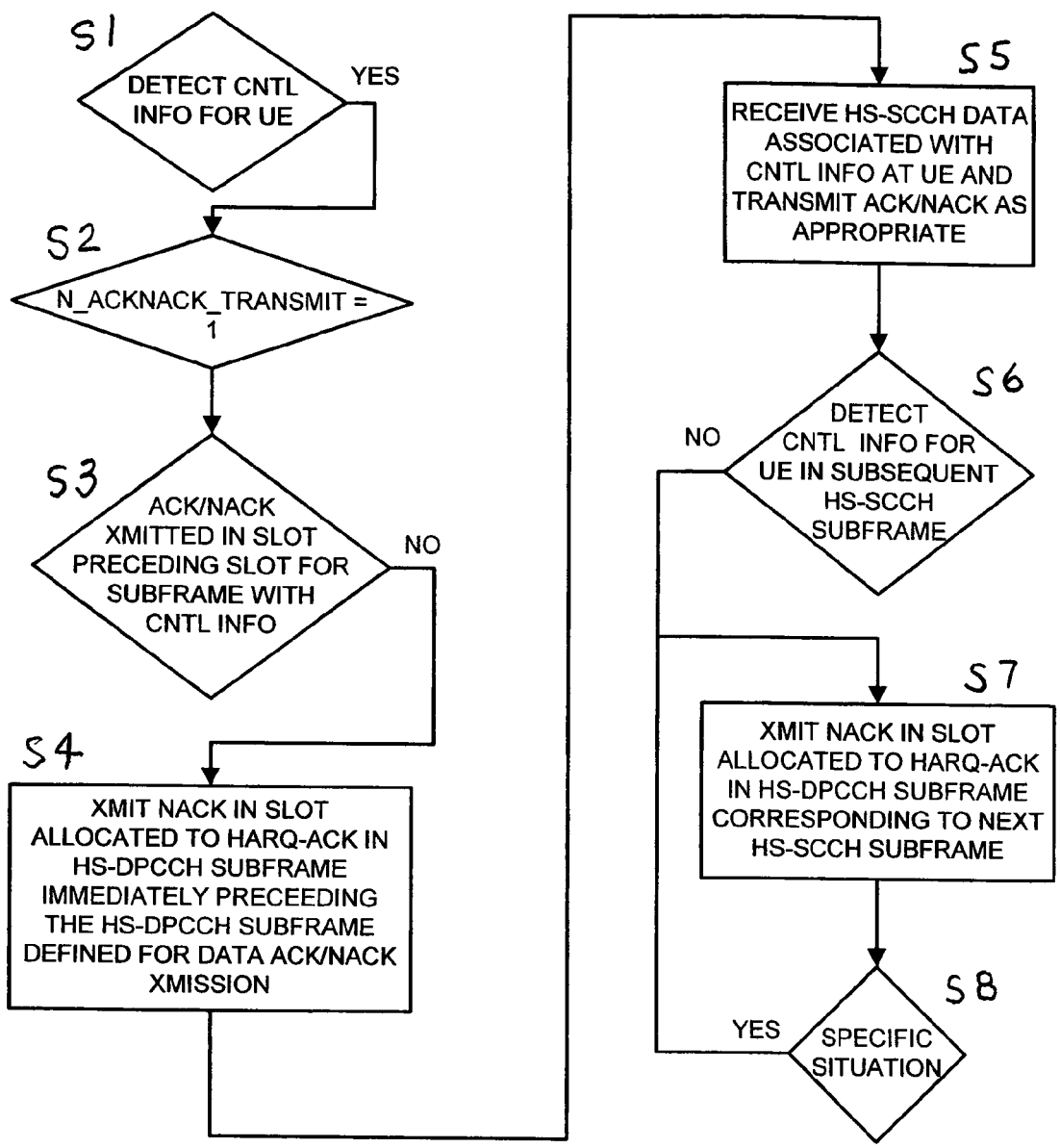
FIG. 4 is a flowchart of a process for improved uplink signal detection according to an example embodiment of the present invention.

FIG. 4 shows a flowchart of a process for improved uplink signal detection according to an example embodiment of the present invention. A UE or mobile device monitors a high-speed shared control channel (HS-SCCH) sub-frame and detects control information from a network node intended for the mobile device, S1. It is determined whether an N_ACKNACK_transmit signal equals 1, S2, and if so, it is determined whether an ACK signal or NACK signal was transmitted in a slot allocated to feedback information, e.g., a hybrid automatic repeat request (HARQ)-ACK process in a HS-DPCCH sub-frame as a result of a HARQ-ACK process from a HS-SCCH sub-frame preceding the HS-SCCH sub-frame, S3. If no ACK or NACK was transmitted, a NACK is transmitted in a slot allocated to a HARQ-ACK in a HS-DPCCH sub-frame immediately preceding an HS-DPCCH sub-frame defined for an ACK signal or an NACK signal transmission for HS-DSCH data associated with the control information S4.

The HS-DSCH data indicated by the control information is received at the mobile device and an ACK or NACK is transmitted to the network node in accordance with appropriate receipt of the HS-DSCH data, S5. It is then determined whether control information intended for the mobile device is detected in a next valid HS-SCCH sub-frame following a sub-frame in which control information intended for the mobile device was detected, S6, and if not, a NACK signal is transmitted in a slot allocated to a HARQ-ACK in a HS-DPCCH sub-frame corresponding to the next valid HS-SCCH sub-frame, S7.

It may then be determined whether a specific situation exists, S8, and if so, another NACK may be transmitted S7 as long as the specific situation exists. Specific situations may be detected by the network device or the mobile device and include situations such as, for example, the mobile device being in a soft handover situation having more than one radio link allocated, a maximum power being reached, site selection diversity transmission (SSDT) signaling indicating a high-speed downlink packet access (HSDPA) serving cell being non-primary, detecting channel quality indication (CQI) for a worst possible data rate/offset, a mismatch over a certain period between power control decisions in a soft handover area and power control demands from a high-speed downlink packet access serving cell.

Figure 5:
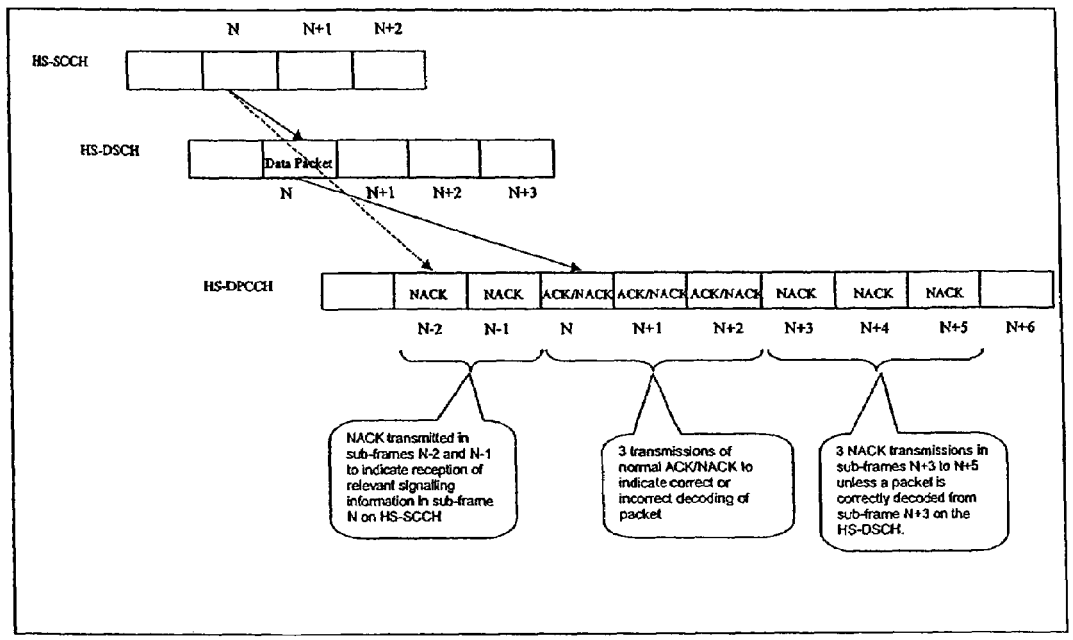
FIG. 5 is a diagram of channels for improved uplink signal detection according to another example embodiment of the present invention.

FIG. 5 shows a diagram of channels for improved uplink signal detection according to another example embodiment of the present invention. The present invention allows for enabling a reduced offset to the Node B's ACK/NACK decision threshold, and hence a significantly lower ACK transmit power, is fully compatible with the use of ACK/NACK repetition. In this embodiment of the present invention, N_ack_nack_transmit (i.e. the total number of ACK/NACK transmissions including repetitions) is greater than 1. Specifically, this figure shows an example where N_ack_nack_transmit=3. When the UE detects relevant control information in the sub-frame labeled "N" on the HS-SCCH, the UE transmits a NACK in sub-frames N−2 and N−1 on the HS-DPCCH (unless a packet was successfully decoded from sub-frame N−N_ack_nack_transmit on the HS-DSCH). In sub-frames N to N+N_ack_nack_transmit−1 on the HS-DPCCH, the UE transmits the normal ACK or NACK indicating the result of decoding the packet received in sub-frame N on the HS-DSCH. In sub-frames N+N_ack_nack_transmit to N+(2*N_ack_nack_transmit)-1 on the HS-DPCCH the UE transmits a NACK (unless a packet is successfully decoded from sub-frame N+N_ack_nack_transmit on the HS-DSCH). In sub-frames N+2*N_ack_nack_transmit onwards on the HS-DPCCH, the UE goes back to using DTX in the ACK/NACK field (unless new relevant control information is detected on the HS-SCCH). In this way, the detection of DTX is spread over more sub-frames than using repetition alone, so the Node B can offset its decision threshold less than with repetition alone.

Figure 6:
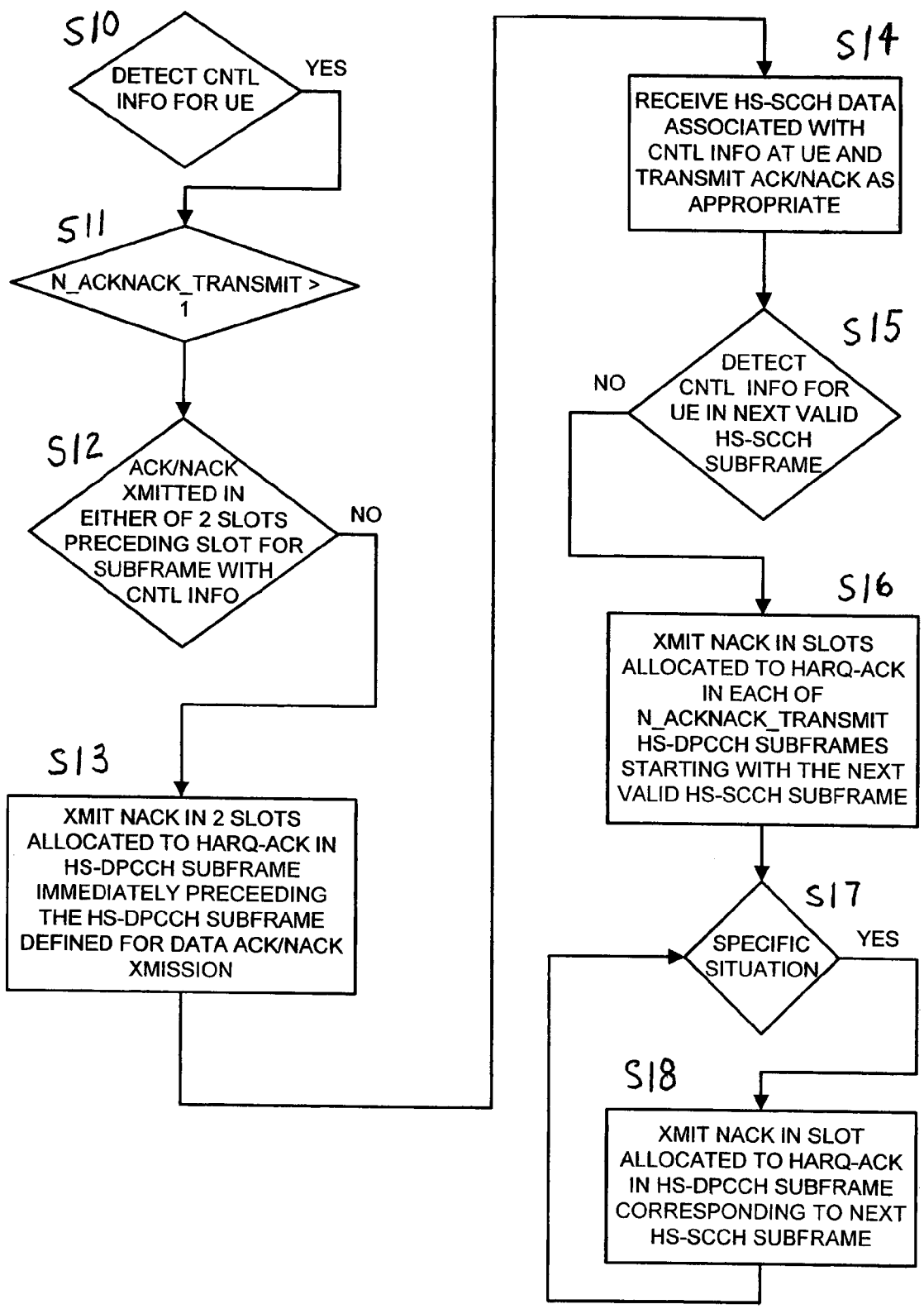
FIG. 6 is a flowchart for improved uplink signal detection according to another example embodiment of the present invention.

FIG. 6 shows a flowchart for improved uplink signal detection according to another example embodiment of the present invention. Control information from a network node is detected as being intended for a mobile device during a HS-SCCH sub-frame, S10. It is determined if an N_ACK-NACK_transmit value is larger than 1, S11, and if so, it is determined whether an acknowledgement transmission occurred in slots as a result of feedback information, e.g., a HARQ-ACK process from a preceding HS-SCCH sub-frame immediately preceding the HS-SCCH sub-frame or a HS-SCCH sub-frame preceding the preceding HS-SCCH sub-frame, S12. If not, a NACK is transmitted in two slots allocated to a HARQ-ACK in two preceding DS-DPCCH sub-frames immediately preceding a HS-DPCCH sub-frame defined for an acknowledgement transmission for HS-DSCH data associated with the control information, S13

The HS-DSCH data indicated by the control information is received at the mobile device and an ACK/NACK is transmitted in accordance with appropriate receipt or lack of receipt of the HS-DSCH data, S14. It may then be determined if control information intended for the mobile device was detected in a next valid HS-SCCH sub-frame following a sub-frame in which control information intended for the mobile device is detected, S15, and if not, a NACK may be transmitted in a slot allocated to HARQ-ACK in each of n_acknack_transmit sub-frames starting with the HS-DPCCH sub-frame corresponding to the next valid HS-SCCH sub-frame, S16.

It may then be determined whether a specific situation exists, S17, and if so, a NACK may be transmitted in a slot allocated to HARQ-ACK in a HS-DPCCH sub-frame corresponding to a next HS-SCCH sub-frame, S18. Specific situations may be detected by the network device or the mobile device and include situations such as, for example, the mobile device being in a soft handover situation having more than one radio link allocated, a maximum power being reached, site selection diversity transmission (SSDT) signaling indicating a high-speed downlink packet access (HS-DPA) serving cell being non-primary, detecting channel quality indication (CQI) for a worst possible data rate/offset, a mismatch over a certain period between power control decisions in a soft handover area and power control demands from a high-speed downlink packet access serving cell.

Figure 7:
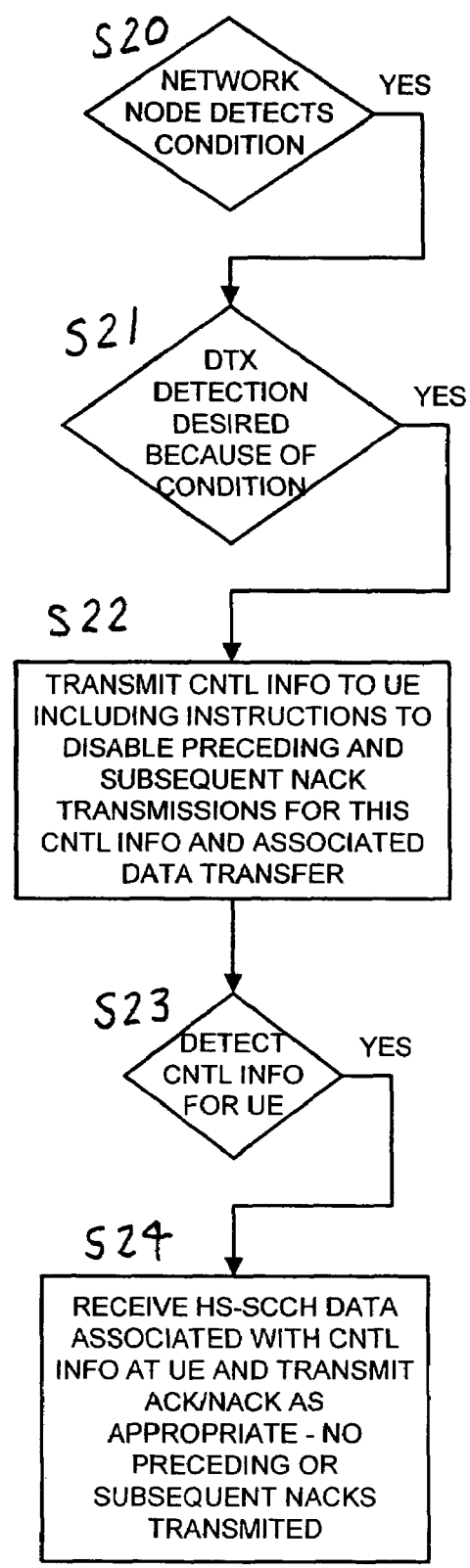
FIG. 7 is a flowchart of a process for enabling or disabling improved uplink signal detection according to an example embodiment of the present invention.
Figure 8:
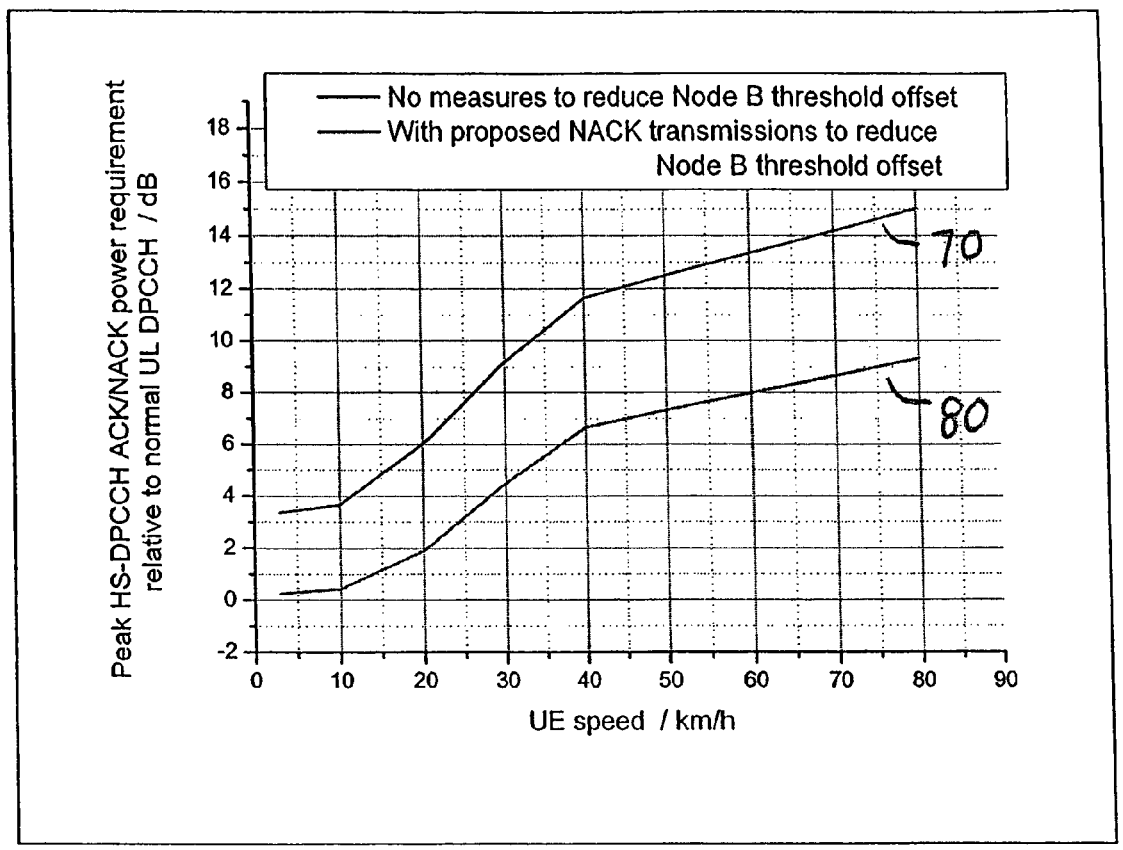
FIGS. 8–11 are graphs of simulation results according to example embodiments of the present invention.
Figure 9:
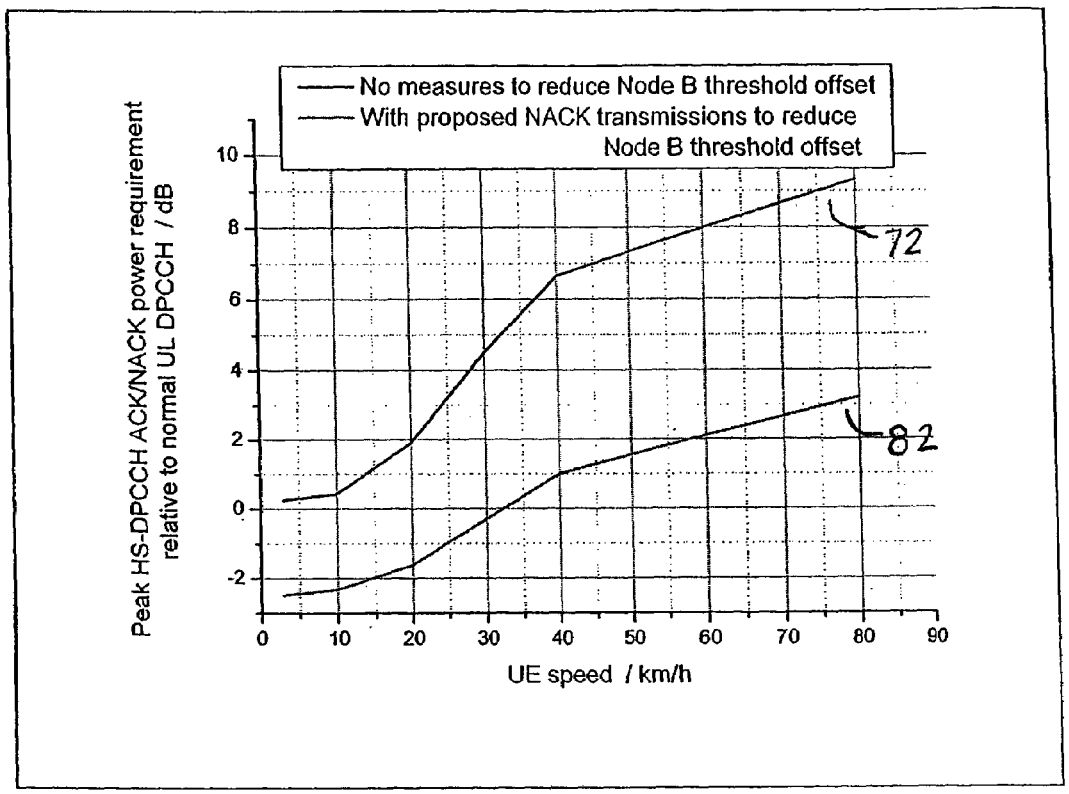
Figure 10:
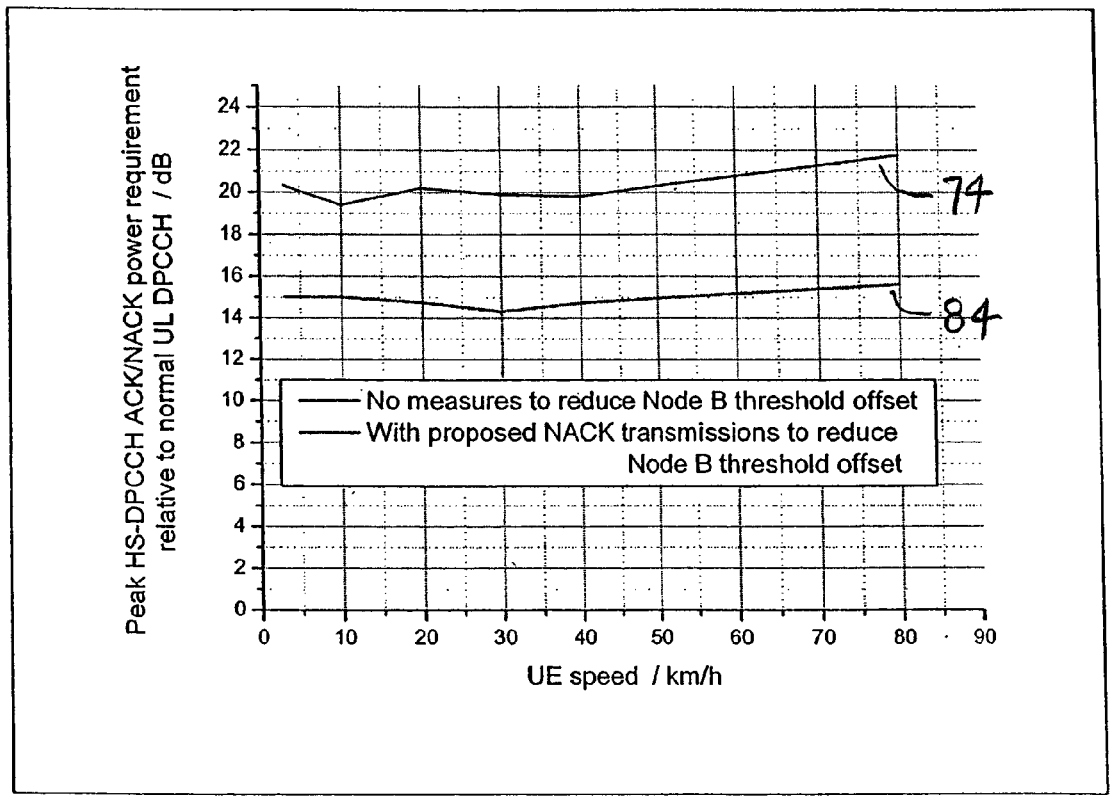
Figure 11:
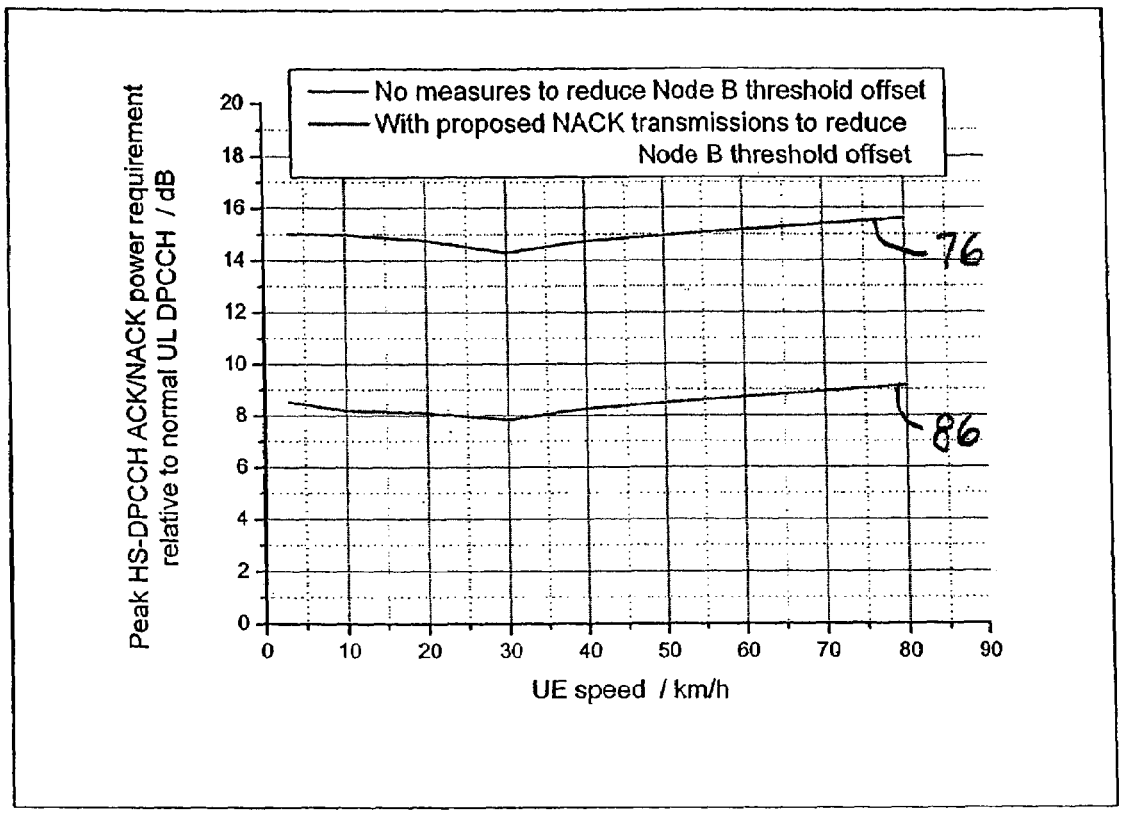

FIG. 7 shows a flowchart of a process for enabling or disabling improved uplink signal detection according to an example embodiment of the present invention. It is determined whether a network node detects a condition, S20 and if so, the network node determines whether DTX detection is desired based on this condition, S21. If DTX detection is desired, control information may be transmitted to a mobile device that includes instructions to disable preceding and subsequent NACK transmissions and allow DTX detection for this control information and associated data transfer, S22. The mobile device detects control information intended for the mobile device, S23, and receives the HS-SCCH data associated with the control information. The mobile device transmits an ACK/NACK as appropriate for appropriate receipt of the data, but does not transmit any preceding or subsequent NACKs, S24.

FIGS. 8–11 show graphs of simulation results according to example embodiments of the present invention. Each graph has an x-axis that represents UE speed/km/h and a y-axis that represents Peak HS-DPCCH ACK/NACK power requirement relative to normal UL DPCCH/dB. Further, each graph shows two curves, a first curve of results where no measures to reduce Node B threshold offset, 70, 72, 74, 76 in FIGS. 8–11, respectively, and a second curve of results with proposed NACK transmissions to reduce Node B threshold offset, 80, 82, 84, 86 in FIGS. 8–11, respectively. In these simulations it is assumed the use of Rx diversity at the Node B, with 2 uncorrelated antennas. The channel model is Pedestrian A. A static ACK/NACK decision threshold is set according to the probability of DTX being wrongly detected as ACK.

For UE speeds in the range 0–40 km/h, the channel estimation at the Node B is carried out using the pilot bits from 3 consecutive UL slots. Above 40 km/h, the pilot bits from only 1 slot are used for the channel estimation. This ensures that the best method of channel estimation is always used as the benchmark.

Other general simulation assumptions include: 2 GHz carrier frequency; Pedestrian A channel—Rayleigh fast fading, classical Doppler spectrum, no shadowing; 4% error rate (AWGN) on DL TPC commands; UL power control step size 1 dB, algorithm 1; UL DPCCH SIR target set to give 4% TPC error rate; same SIR target in SHO as for non-SHO; interference in UL modeled as AWGN; and soft combining of 10 ACK/NACK field bits.

Simulation results are presented for both non-SHO and SHO with 2 Node Bs, as well as for both the original non-relaxed error requirements (i.e., P(NACK→ACK)=$10^{-4}$ with P(DTX->ACK)0.01) and the relaxed error requirements (i.e., P(NACK→ACK)=$10^{-4}$ with P(DTX->ACK)=0.1).

The results in FIGS. 8–11 show how much the high ACK power requirement is due to the need to offset the decision threshold at the Node B so as to avoid misdetecting DTX as ACK. If this can be avoided, or at least mitigated, the required ACK power is reduced by approximately between 3 dB and 6 dB.

Embodiments according to the present invention are very advantageous for several reasons. The present invention provides an improvement to previous proposals for a timer to control the use of DTX in the ACK/NACK field. According to the present invention, the UE may transmit a NACK in the sub-frame before the normal ACK/NACK if it detects relevant HS-SCCH signaling, and it transmits one NACK in the sub-frame following the ACK/NACK (unless an immediately following packet is correctly decoded, in which case ACK is sent).

Moreover, the present invention significantly reduces the amount by which the Node B must offset its ACK/NACK decision threshold, resulting in approximately a 3–6 dB reduction in required ACK power. In addition, the present invention continues to give a useful reduction in the ACK power requirement when used in conjunction with any other HS-DPCCH power reduction method, including repetition or relaxation of the error rate requirements.

Further, the present invention has no impact on the higher layer protocols or on the processing time available for the UE or Node B. Although the present invention can easily be used together with ACK/NACK repetition, as a possible simplification its application could be limited to the case with only one repetition. Also, the present invention is advantageous in that it allows improved Node B detection performance and system throughput and coverage.

The NACK transmission sub-frame N+1 is beneficial in the case that two consecutive packets are sent, but the UE only detects the first one. The Node B can then more reliably detect a NACK for the second packet than a DTX. The reduction in ACK transmit power is achieved regardless of how bursty or disparate the pattern of DL packets is. The peak ACK/NACK transmit power is therefore significantly reduced for all packets for any traffic model.

Moreover, embodiments according to the present invention directly tackles the offset threshold at the Node B, and are totally compatible with any other power-reduction mechanism for the HS-DPCCH (e.g. ACK/NACK repetition or relaxation of error rate requirements), and offer an additional reduction in peak ACK/NACK power. Further, the present invention provides a useful complement to the use of ACK/NACK repetition, as it can still give benefit in situations where repetition not desirable, for example at high packet throughputs. The present invention also has no impact on the ACK/NACK protocol.

The invention allows signaling requirements to be able to switch this functionality on and off. This may be signaled as a higher layer parameter, together with other parameters like N_ack_nack_transmit. The present invention may enable the functionality to be switched off, for example if the Node B specifically wanted to detect DTX separately from NACK, for example if non-self-decodable retransmissions were being used.

Moreover, the transmission of a NACK in sub-frame N−1 has no impact on the processing time available to the UE for decoding the HS-DSCH packet, as the UE may always transmit a NACK in the earlier sub-frame, regardless of whether the packet would be correctly decoded or not. The early NACK may simply indicate that the UE has detected relevant signaling on the HS-SCCH.

It is noted that the foregoing examples have been provided merely for the purpose of explanation and are in no way to be construed as limiting of the present invention. While the present invention has been described with reference to a preferred embodiment, it is understood that the Words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for controlling transmit power in a mobile device in a network comprising:

detecting control information from a network node during a control channel sub-frame intended for a mobile device;

transmitting a signal in a slot allocated to feedback information in an uplink channel sub-frame immediately preceding an uplink channel sub-frame defined for an acknowledge (ACK) signal or a negative acknowledge (NACK) signal transmission for downlink channel data associated with the control information if no ACK signal or NACK signal was transmitted in the slot allocated to feedback information in the uplink channel sub-frame as a result of a feedback information process from a control channel sub-frame preceding the control channel sub-frame;

receiving the downlink channel data indicated by the control information at the mobile device and transmitting an ACK signal or NACK signal in accordance with appropriate receipt of the downlink channel data; and determining if the control information intended for the mobile device is detected in a next valid control channel sub-frame following a sub-frame in which the control information intended for the mobile device was detected, and if not, transmitting a signal in the slot allocated to feedback information in the uplink channel sub-frame corresponding to the next valid control channel sub-frame.

2. The method according to claim 1, wherein the control channel comprises a high-speed shared control channel (HS-SCCH).

3. The method according to claim 1, wherein the feedback information comprises a hybrid automatic repeat request (HARQ-ACK).

4. The method according to claim 1, wherein the uplink channel comprises a high-speed dedicated physical control channel (HS-DPCCH).

5. The method according to claim 1, wherein the downlink channel comprises a high-speed downlink shared channel (HS-DSCH).

6. The method according to claim 1, further comprising determining if a specific situation exists and if so, determining if the control information intended for the mobile device is detected in a next valid control channel sub-frame, and if not, transmitting the NACK signal in the slot allocated to feedback information in the uplink channel sub-frame corresponding to the next valid control channel sub-frame.

7. The method according to claim 6, wherein the specific situation comprises at least one of the mobile device being in a soft handover situation having more than one radio link allocated, a maximum power being reached, SSDT signaling indicating HSDPA serving cell being non-primary, detecting channel quality indication (CQI) for a worst possible data rate/offset, a mismatch over a certain period between power control decisions in soft handover area (SHO) and power control commands from a high-speed downlink packet access (HSDPA) serving cell.

8. The method according to claim 1, wherein said slot comprises a Transmission Time Interval (TTI).

9. The method according to claim 1, wherein the mobile device is a mobile phone.

10. The method according to claim 1, wherein the network node comprises one of a Radio Resource Controller (RRC) and a Base Station Controller (BSC).

11. The method according to claim 1, wherein a DTX_MODE signal equals one.

12. The method according to claim 1, wherein an N_ACKNACK_TRANSMIT value equals one.

13. The method according to claim 1, wherein the network comprises a Radio Access Network (RAN).

14. The method according to claim 1, wherein the network node avoids having to detect continuous DTX transmissions in a HARQ-ACK sub-frame, allowing a reduction in a required ACK transmission power at the mobile device.

15. The method according to claim 1, further comprising instructing the mobile device by the network node whether to perform the transmitting step and the determining step.

16. The method according to claim 15, further comprising instructing the mobile device by the network node to perform the transmitting step and the determining step when the mobile device is in a soft handover area.

17. A method for reducing transmit power in a mobile device in a network comprising:

detecting control information from a network node intended for a mobile device during a control channel sub-frame;

determining if an N_acknack_transmit value >1, and if so, transmitting a negative acknowledge signal (NACK) in two slots allocated to feedback information in two preceding uplink channel sub-frames immediately preceding an uplink channel sub-frame defined for an acknowledgement transmission for downlink channel data associated whith the control information if no acknowledgement transmission occurred in slots as a result of a feedback information process from a preceding control channel sub-frame immediately preceding the control channel sub-frame or a control channel sub-frame preceding the preceding control channel sub-frame;

receiving the downlink channel data indicated by the control information at the mobile device and transmitting an ACK signal or the NACK signal in accordance with appropriate receipt of the downlink channel data; and determining if the control information intended for the mobile device is detected in a next valid control channel sub-frame following a sub-frame in which the control information intended for the mobile device was detected, and if not, transmitting a signal in a slot allocated to the feedback information in each of N_acknack_transmit sub-frames starting in the uplink channel sub-frame corresponding to the next valid control channel sub-frame.

18. The method according to claim 17, wherein the control channel comprises a high-speed shared control channel (HS-SCCH).

19. The method according to claim 17, wherein the feedback information comprises a hybrid automatic repeat request (HARQ-ACK).

20. The method according to claim 17, wherein the uplink channel comprises a high-speed dedicated physical control channel (HS-DPCCH).

21. The method according to claim 17, wherein the downlink channel comprises a high-speed downlink shared channel (HS-DSCH).

22. The method according to claim 17, further comprising determining if a specific situation exists and if so determining if a DTX mode signal=1, and if so, determining if the control information intended for the mobile device is detected in a next valid control channel sub-frame following the sub-frame in which the control information intended for the mobile device was detected, and if so, transmitting the NACK signal in the slot allocated to the feedback information in each of N_acknack_transmit sub-frames starting in the uplink channel sub-frame corresponding to the next valid control channel sub-frame.

23. The method according to claim 22, wherein the specific situation comprises at least one of the mobile device being in a soft handover situation having more than one radio link allocated, a maximum power being reached, SSDT signaling indicating HSDPA serving cell being non-primary, detecting CQI for a worst possible data rate/offset, and a mismatch over a certain period between power control decisions in SHO and power control commands from the HSDPA serving cell.

24. The method according to claim 17, wherein said slot comprises a Transmission Time Interval (TTI).

25. The method according to claim 17, wherein the mobile device is a mobile phone.

26. The method according to claim 17, wherein the network node comprises one of a Radio Resource Controller (RRC) and a Base Station Controller (BSC).

27. The method according to claim 17, wherein a DTX_MODE signal equals one.

28. The method according to claim 17, wherein the network comprises a Radio Access Network (RAN).

29. The method according to claim 17, wherein the network node avoids having to detect continuous DTX transmissions in a HARQ-ACK sub-frame, allowing a reduction in a required ACK transmission power at the mobile device.

30. The method according to claim 17, further comprising instructing the mobile device by the network node whether to perform the transmitting step and the determining step.

31. The method according to claim 30, further comprising instructing the mobile device by the network node to perform the transmitting step and the determining step when the mobile device is in a soft handover area.

32. A system for controlling transmit power in a mobile device in a network comprising:
   a network device, the network device operatively connected to the network and sending control information in sub-frames of a control channel and associated data in the sub-frames of a downlink channel to at least one mobile device; and
   a mobile device, the mobile device operatively connected to the network and detecting control information during a control channel sub-frame intended for the mobile device and performing:
   transmitting to the network device a signal in a slot allocated to feedback information in an uplink channel sub-frame immediately preceding an uplink channel sub-frame defined for an acknowledge (ACK) signal or a negative acknowledge (NACK) signal transmission for downlink channel data associated with the control information if no ACK signal or NACK signal was transmitted in the slot allocated to feedback information in the uplink channel sub-frame as a result of a feedback information process from a control channel sub-frame preceding the control channel sub-frame;
   receiving the downlink channel data indicated by the control information at the mobile device and transmitting an ACK signal or NACK signal in accordance with appropriate receipt of the downlink channel data to the network device; and
   determining if the control information intended for the mobile device is detected in a next valid control channel sub-frame following a sub-frame in which the control information intended for the mobile device was detected, and if not, transmitting a signal to the network node in the slot allocated to feedback information in the uplink channel sub-frame corresponding to the next valid control channel sub-frame.

33. The system according to claim 32, wherein the control channel comprises a high-speed shared control channel (HS-SCCH).

34. The system according to claim 32, wherein the feedback information comprises a hybrid automatic repeat request (HARQ-ACK).

35. The system according to claim 32, wherein the uplink channel comprises a high-speed dedicated physical control channel (HS-DPCCH).

36. The system according to claim 32, wherein the downlink channel comprises a high-speed downlink shared channel (HS-DSCH).

37. A system for reducing transmit power in a mobile device in a network comprising:
   a network device, the network device operatively connected to the network and sending control information in sub-frames of a control channel and associated data in sub-frames of a downlink channel to at least one mobile device; and
   a mobile device, the mobile device operatively connected to the network and detecting control information from the network device intended for the mobile device during a control channel sub-frame and performing:
   determining if an N_acknack_transmit value >1, and if so, transmitting a negative acknowledge signal (NACK) in two slots allocated to feedback information in two preceding uplink channel sub-frames immediately preceding an uplink channel sub-frame defined for an acknowledgement transmission for downlink channel data associated with the control information if no acknowledgement transmission occurred in slots as a result of a feedback information process from a preceding control channel sub-frame immediately preceding said control channel sub-frame or a control channel sub-frame preceding said preceding control channel sub-frame;
   receiving said downlink channel data indicated by the control information at the mobile device and transmitting an ACK signal or the NACK signal in accordance with appropriate receipt of said downlink channel data; and
   determining if the control information intended for the mobile device is detected in a next valid control channel sub-frame following a sub-frame in which the control information intended for the mobile device was detected, and if not, transmitting a signal in a slot allocated to feedback information in each of N_acknack_transmit sub-frames starting in the uplink channel sub-frame corresponding to the next valid control channel sub-frame.

38. The system according to claim 37, wherein the control channel comprises a high-speed shared control channel (HS-SCCH).

39. The system according to claim 37, wherein the feedback information comprises a hybrid automatic repeat request (HARQ-ACK).

40. The system according to claim 37, wherein the uplink channel comprises a high-speed dedicated physical control channel (HS-DPCCH).

41. The system according to claim 37, wherein the downlink channel comprises a high-speed downlink shared channel (HS-DSCH).

42. A mobile device containing a storage medium with instructions stored therein, the instructions when executed causing the mobile device to perform:
   detecting control information from a network node during a control channel sub-frame intended for the mobile device;
   transmitting a signal in a slot allocated to feedback information in an uplink channel sub-frame immediately preceding an uplink channel sub-frame defined for an acknowledge (ACK) signal or a negative acknowledge (NACK) signal transmission for downlink channel data associated with the control information if no ACK signal or NACK signal was transmitted in a slot allocated to feedback information in the uplink channel sub-frame as a result of a feedback information process from a control channel sub-frame preceding the control channel sub-frame;

receiving the downlink channel data indicated by the control information at the mobile device and transmitting an ACK signal or NACK signal in accordance with appropriate receipt of the downlink channel data; and determining if the control information intended for the mobile device is detected in a next valid control channel sub-frame following a sub-frame in which the control information intended for the mobile device was detected, and if not, transmitting a signal in the slot allocated to the feedback information in the uplink channel sub-frame corresponding to the next valid control channel sub-frame.

43. The mobile device according to claim 42, wherein the control channel comprises a high-speed shared control channel (HS-SCCH).

44. The mobile device according to claim 42, wherein the feedback information comprises a hybrid automatic repeat request (HARQ-ACK).

45. The mobile device according to claim 42, wherein the uplink channel comprises a high-speed dedicated physical control channel (HS-DPCCH).

46. The mobile device according to claim 42, wherein the downlink channel comprises a high-speed downlink shared channel (HS-DSCH).

47. The mobile device according to claim 42, wherein the mobile device is a mobile phone.

48. A mobile device containing a storage medium with instructions stored therein, the instructions when executed causing the mobile device to perform:

detecting control information from a network node intended for the mobile device during a control channel sub-frame;

determining if an N_acknack_transmit value >1, and if so, transmitting a negative acknowledge signal (NACK) in two slots allocated to feedback information in two preceding uplink channel sub-frames immediately preceding an uplink channel sub-frame defined for an acknowledgement transmission for downlink channel data associated with the control information if no acknowledgement transmission occurred in slots as a result of a feedback information process from a preceding control channel sub-frame immediately preceding the control channel sub-frame or the control channel sub-frame preceding the preceding control channel sub-frame;

receiving the downlink channel data indicated by the control information at the mobile device and transmitting an ACK signal or the NACK signal in accordance with appropriate receipt of the downlink channel data; and determining if the control information intended for the mobile device is detected in a next valid control channel sub-frame following a sub-frame in which the control information intended for the mobile device was detected, and if not, transmitting the NACK signal in a slot allocated to the feedback information in each of N_acknack_transmit sub-frames starting in the uplink channel sub-frame corresponding to the next valid control channel sub-frame.

49. The mobile device according to claim 48, wherein the control channel comprises a high-speed shared control channel (HS-SCCH).

50. The mobile device according to claim 48, wherein the feedback information comprises a hybrid automatic repeat request (HARQ-ACK).

51. The mobile device according to claim 48, wherein the uplink channel comprises a high-speed dedicated physical control channel (HS-DPCCH).

52. The mobile device according to claim 48, wherein the downlink channel comprises a high-speed downlink shared channel (HS-DSCH).

53. The mobile device according to claim 48, wherein the mobile device is a mobile phone.

54. A network node containing a storage medium with instructions stored therein, the instructions when executed causing the network node to perform:

sending control information to a mobile device during a control channel sub-frame intended for the mobile device;

receiving a signal from the mobile device in a slot allocated to feedback information in an uplink channel sub-frame immediately preceding an uplink channel sub-frame defined for an acknowledge (ACK) signal or a negative acknowledge (NACK) signal reception for downlink channel data associated with the control information;

transmitting the downlink channel data indicated by the control information to the mobile device and receiving the ACK signal or the NACK signal in accordance with appropriate receipt of the downlink channel data by the mobile device; and receiving the signal from the mobile device in the slot allocated to the feedback information in the uplink channel sub-frame corresponding to a next valid control channel sub-frame, if the mobile device determines that control information intended for the mobile device is not detected in the next valid control channel sub-frame following a sub-frame in which the control information intended for the mobile device was detected.

55. The network node according to claim 54, wherein the control channel comprises a high-speed shared control channel (HS-SCCH).

56. The network node according to claim 54, wherein the feedback information comprises a hybrid automatic repeat request (HARQ-ACK).

57. The network node according to claim 54, wherein the uplink channel comprises a high-speed dedicated physical control channel (HS-DPCCH).

58. The network node according to claim 54, wherein the downlink channel comprises a high-speed downlink shared channel (HS-DSCH).

59. The network node according to claim 54, wherein the network node comprises one of a Radio Resource Controller (RRC) and a Base Station Controller (BSC).

60. The network node according to claim 54, wherein the mobile device is a mobile phone.

61. A network node containing a storage medium with instructions stored therein, the instructions when executed causing the network node to perform:

sending control information intended for a mobile device during a control channel sub-frame;

receiving a signal (NACK) from the mobile device in two slots allocated to feedback information in two preceding uplink channel sub-frames immediately preceding an uplink channel sub-frame defined for an acknowledgement reception for downlink channel data associated with the control information if no acknowledgement reception occurred in slots as a result of a feedback information process from a preceding control channel sub-frame immediately preceding the control channel sub-frame or the control channel sub-frame preceding the preceding control channel sub-frame and if an N_acknack_transmit value >1;

transmitting the downlink channel data indicated by the control information to the mobile device and receiving an ACK signal or NACK signal in accordance with appropriate receipt of the downlink channel data by the mobile device; and receiving the NACK signal from the mobile device in a slot allocated to the feedback information in each of N_acknack_transmit sub-frames starting in the uplink channel sub-frame corresponding to a next valid control channel sub-frame if the mobile device determined that control information intended for the mobile device is not detected in a next valid control channel sub-frame following the sub-frame in which the control information intended for the mobile device was detected.

62. The network node according to claim 61, wherein the control channel comprises a high-speed shared control channel (HS-SCCH).

63. The network node according to claim 61, wherein the feedback information comprises a hybrid automatic repeat request (HARQ-ACK).

64. The network node according to claim 61, wherein the uplink channel comprises a high-speed dedicated physical control channel (HS-DPCCH).

65. The network node according to claim 61, wherein the downlink channel comprises a high-speed downlink shared channel (HS-DSCH).

66. The network node according to claim 61, wherein the mobile device is a mobile phone.

67. The network node according to claim 61, wherein the network node comprises one of a Radio Resource Controller (RRC) and a Base Station Controller (BSC).

* * * * *